United States Patent [19]

Peterson

[15] 3,656,714
[45] Apr. 18, 1972

[54] VALVE SEAT RETAINING MEANS AND METHOD OF ASSEMBLY AND DISASSEMBLY

[72] Inventor: Leslie R. Peterson, St. Cloud, Minn.
[73] Assignee: De Zurik Corporation, Sartell, Minn.
[22] Filed: Dec. 3, 1970
[21] Appl. No.: 94,875

[52] U.S. Cl. ..............................25/360, 251/151, 251/306, 29/157.1
[51] Int. Cl. .........................................F16k 1/22
[58] Field of Search...............251/148, 151, 152, 306, 360; 277/160; 287/DIG. .007; 29/157.1

[56] References Cited

UNITED STATES PATENTS

| 3,175,802 | 3/1965 | Bredtschneider | 251/360 X |
| 3,341,209 | 9/1967 | Prasse et al. | 277/160 |
| 3,517,689 | 6/1970 | Roos | 251/306 X |
| 3,586,290 | 6/1971 | Null | 251/306 |

Primary Examiner—William R. Cline
Attorney—Wolfe, Hubbard, Leydig, Voit & Osann

[57] ABSTRACT

A spring biased valve seat retaining means in the form of an annular sector is inserted wholly within the deeper one of two grooves formed in the inner periphery of the valve body and the outer periphery of the valve seat and snaps into the shallower groove while remaining partially in the deeper groove when the grooves are brought into registry. The shallower groove and the retaining means are formed with cooperatively inclined end portions whereby the retaining means is forced into the deeper groove upon rotation of the seat relative to the body to permit axial removal of the seat from the body.

15 Claims, 9 Drawing Figures

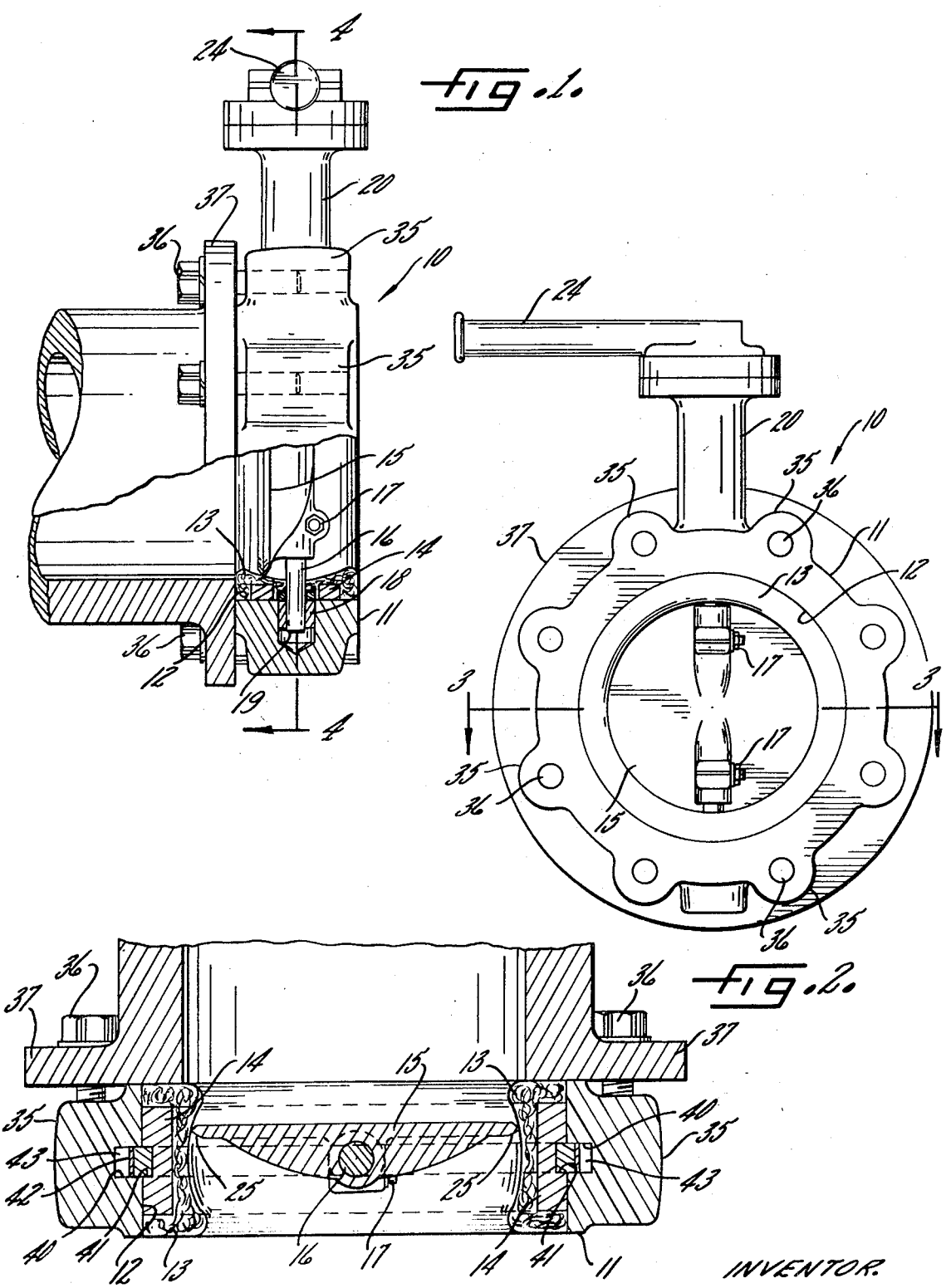

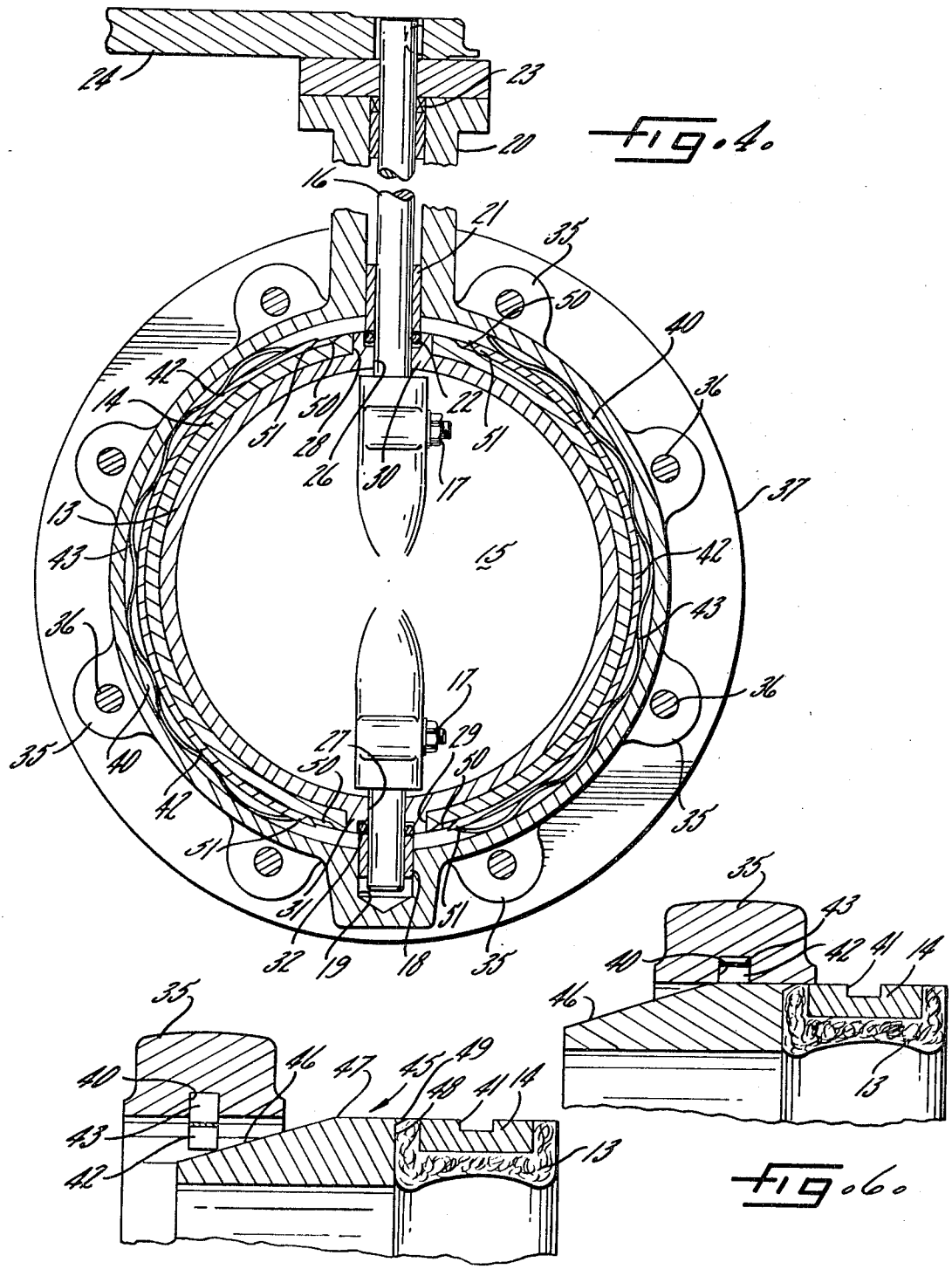

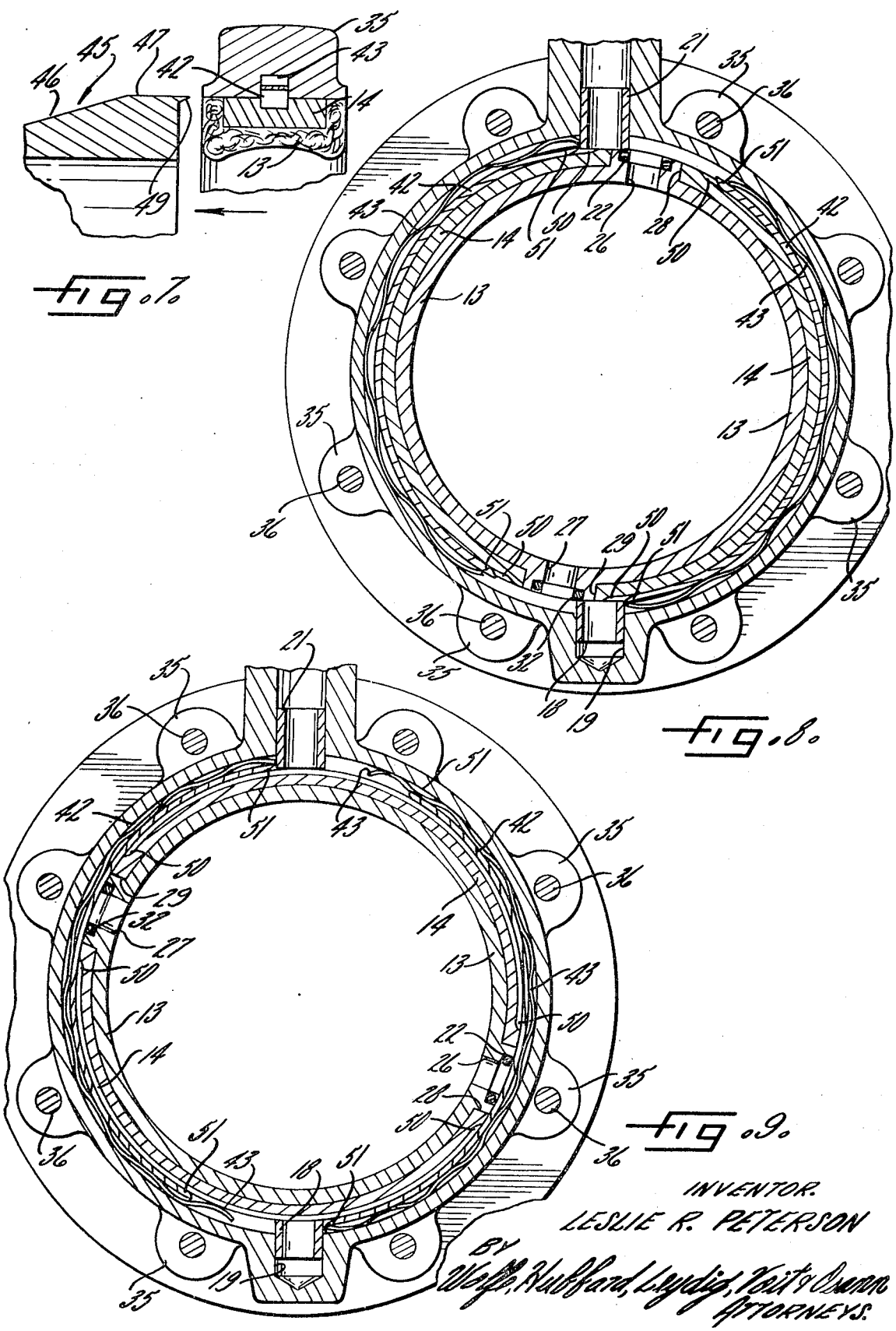

VALVE SEAT RETAINING MEANS AND METHOD OF ASSEMBLY AND DISASSEMBLY

BACKGROUND OF THE INVENTION

The present invention relates generally to valves and more particularly concerns a valve seat retaining means for resisting axial movement of the valve seat in the valve body and a method of installing and removing the valve seat and retaining means relative to the valve body.

One common form of valve is the disc or butterfly valve in which the valve disc, in its closed position, engages a resilient liner or seating ring placed in the bore of the valve body. For high pressure applications the resilient liner is usually reinforced with a rigid backing ring which provides improved structural stability and rigidity to the resilient seating ring. Because of their simplicity of design and minimum space requirements, butterfly valves lend themselves readily to a "wafer-type" configuration in which the valve body is sandwiched and held between opposing pipe flanges drawn together by bolts.

An improved butterfly valve which is constructed in this manner and which provides for an alternate seating capability is disclosed in copending patent application Ser. No. 762,781, filed Sept. 26, 1968, now U.S. Pat. No. 3,517,689, and assigned to the same assignee as the present application. In such a wafer-type butterfly valve, compression of the resilient seating ring and the reinforcing ring between the opposing pipe flanges restrains the ring members from axial movement in the valve body and insures that the valve seat will remain properly positioned relative to the valve disc even under high pressure usage.

There are instances, however, where it is not practical or desirable to mount butterfly valves between pipe flanges. One example is when the valve is used at the end of a pipe for shut-off service with the discharge side of the valve exposed to atmosphere. However, a wafer-type butterfly valve such as disclosed in the above-mentioned application cannot effectively be used for such installations since the resilient seating and reinforcing ring members are not restrained on the discharge side of the valve and they may tend to shift axially within the valve body out of proper sealing engagement with the valve disc resulting in leakage of process fluid.

Accordingly, it is the primary aim of the present invention to provide an improved valve seat retaining means which effectively precludes axially shifting of the seat within the valve body even when the valve is not installed between opposing pipe flanges.

A more particular object of the invention is to provide an improved valve seat retaining means which does not require the use of bolts or screws to hold the seat within the valve body.

It is also an object of the invention to provide a simple yet effective method for installing the valve seat and retaining means in the valve body and for removing the valve seat and retaining means from the valve body.

These and other objects and advantages of the invention will become more readily apparent to those skilled in the art upon reading the following detailed description and upon reference to the attached drawings.

BRIEF DESCRIPTION OF THE DRAWINGS

FIG. 1 is a side elevation, partially in section, of a valve of the type with which the present invention is concerned, with the valve disc shown in closed position;

FIG. 2 is an end view of the valve shown in FIG. 1;

FIG. 3 is an enlarged horizontal cross-section of the valve and seat retaining means as seen substantially along line 3—3 in FIG. 2;

FIG. 4 is an enlarged vertical cross-section of the valve and seat retaining means as seen substantially along 4—4 in FIG. 1;

FIGS. 5, 6 and 7, respectively, are enlarged, fragmentary longitudinal sections of the valve and seat retaining means schematically illustrating the method and sequence of installing them in the valve body; and, FIGS. 8 and 9, respectively, are enlarged vertical cross-sections of the valve and seat retaining means, similar to FIG. 4, schematically illustrating the method and sequence of removing the valve seat and retaining means for the valve body.

DESCRIPTION OF THE PREFERRED EMBODIMENTS

Turning now to the drawings, there is shown in FIGS. 1 and 2 an exemplary butterfly valve 10 of the type with which the present invention is concerned. As shown here, the valve 10 includes a generally tubular body 11 defining an axial bore 12 in which a resilient sealing ring 13 and a rigid backing ring member 14 are located. The resilient seating ring 13 is preferably made of a synthetic rubber or plastic material which is not adversely affected by the process fluids with which the valve 10 is intended to be used, and the seating ring is formed with a generally channel-shaped cross-sectional configuration to encompass and isolate the backing ring 14 from process fluids.

Within the valve body 11, a valve disc 15 is securely mounted on a pivot shaft 16 by means such as tapered lock bolts 17. The lower end of the shaft is preferably journalled in a bushing 18 located in a blind hole 19 in the valve body 11 and the upper end of the shaft 16 projects upwardly through a neck portion 20 of the valve body 11, which contains an upper bushing 21 and shaft sealing elements 22 and 23 (see FIG. 4). An operating handle 24 is secured to the upper end of the shaft 16 to rotate the shaft and open and close the valve disc 15 relative to the seating ring 13.

At its periphery the valve disc 15 is formed with a continuous seat engaging edge 25 which contacts the resilient seating ring 13 when the disc 15 is positioned in its closed position as shown in FIGS. 1–3. Both the resilient seating ring 13 and the rigid backing ring 14 are also continuous elements except for openings 26–29 to permit passage of the operating shaft 16. As shown in FIGS. 1 and 4, the openings 28 and 29 through the backing ring 14 are slightly enlarged and are filled with nipple-like extensions 30 and 31 of the resilient seating ring 13 in which the openings 26 and 27 are formed. Preferably, the openings 26 and 27 are slightly undersized so that the shaft 16 is snuggly yet rotatably engaged therein and the nipple-like extensions 30 and 31 are compressed against the inner walls of the openings 28 and 29. Lower extension 31 may, however, contain a sealing element 32 as an added sealing precaution.

In the illustrated embodiment, the valve body 11 is provided with a plurality of bolt lugs 35 which are tapped to receive stud bolts 36 inserted through the openings formed in a conventional pipe flange 37. When the bolts 36 are drawn tight, the valve body 11 is held firmly and sealingly against the face of the flange 37. Preferably, the portion of the resilient seat 13 facing the flange 37 is also slightly compressed as the bolts 36 are tightened to further seal the joint formed between the valve body 11 and the pipe flange 37 from the process fluid.

In accordance with the present invention, means are provided for retaining the resilient seating ring 13 and the rigid backing ring 14 in the valve body 11. As shown in FIGS. 3 and 4, the inner periphery of the axial bore 12 of the valve body 11 and the outer periphery of the backing ring 14 are provided with circumferentially extending grooves 40 and 41, respectively, of substantially equal width. One of the grooves 40, 41 is deeper than the other and both grooves are adapted to face one another when the resilient seat 13 and backing ring 14 are installed in the bore 12 of the valve body 11.

To hold the resilient seating ring 13 and rigid backing ring 14 against axial movement in the bore 12 of the valve body 11, spring biased retaining means in the form of at least one annular sector 42 is dimensioned to fit wholly within the deeper one of the grooves 40, 41 during installation and removal of the resilient seat and backing ring and is dimensioned to snap into the shallower one of the grooves while remaining partially in the deeper one of the grooves when the grooves are positioned to face one another. The annular sector 42 thus acts as a circumferentially extending key and the grooves 40 and 41 as cooperating keyways. The circumferentially extending key sector 42 is formed with a thickness substantially equal to twice the depth of the shallower one of the grooves 40, 41 and a spring element 43 is preferably interposed between the key sector 42 and the base of the deeper one of the grooves to urge the key sector into the shallower groove.

In the preferred embodiment illustrated in the drawings, the deeper groove 40 is located in the inner periphery of the bore 12 of the valve body 11 and is formed by two substantially semi-circumferentially extending portions, intercepted only by the upper and lower shaft bushings 18 and 21. The shallower groove 41 is located in the outer periphery of the backing member 14 and it, too, preferably is formed by two substantially semi-circumferentially extending portions. Likewise, the retaining means in the preferred embodiment includes a pair of substantially semi-annular key sectors 42 each dimensioned to fit within one facing pair of the grooved portions 41, 41. A separate spring element 43, preferably in the form of a marcel-type spring, is provided for each key sector 42. Each spring element 43 is substantially the same width and length as its companion key sector 42 and it may be attached to the key sector such as by a single spot welded at the center of the spring in the illustrated embodiment. It will be understood, of course, that each of the spring elements 43 tends to straighten out relatively tangent to its respective key sector 42 when the key sector is not held in the groove 40 and the spring is substantially unstressed.

To install the resilient valve seat 13, backing ring 14 and retaining means 42-43 in the bore 12 of the valve body 11, the key sectors 42 and their respective spring elements 43 are first biased wholly within the deeper one of the grooves (40 in the preferred embodiment). As shown in schematic sequence in FIGS. 5 and 6 this may be conveniently accomplished with the use of an expander mandrel 45 having a tapered nose portion 46 leading to a straight body section 47 dimensioned to slidingly fit just within the bore 12 of the valve body 11. By pushing the mandrel 45 from the position shown in FIG. 5 to the position shown in FIG. 6, the key sectors 42 and their respective spring elements are biased entirely into the grooves 40. The resilient seating ring 13 and rigid backing ring 14 as a unit are then axially aligned with the bore 12 of the valve body 11 and brought into engagement with the rear surface 48 of the mandrel. The mandrel 45 is then pushed on through the bore 12 from the position shown in FIG. 6 to the position shown in FIG. 7 by applying an axial force to the rear end of the seating ring-backing ring unit. When the grooved portions 41 in the backing ring 14 are axially aligned with the grooved portions 40 in the bore 12, the spring elements 43 bias the annular key sectors 42, into the groove portions 41. To prevent scuffing of the resilient seating ring 13 adjacent its leading peripheral edge, the mandrel 45 is preferably formed with a circumferential protective lip 49 adjacent its trailing peripheral edge.

The installation of the valve seat and retaining means in the valve body is accomplished, of course, with the valve disc 15 and its support shaft 16 removed from the valve 10. This is necessary to permit axial passage of the mandrel 45 and the seating ring-backing ring unit into the valve bore 12. It will also be understood that, in the illustrated embodiment, the two annular key sectors 42 and their associated spring elements 43 are positioned in the deeper grooved portions 40 in locations substantially symmetrical relative to the bushings 18 and 21. Likewise, the seating ring 13 and backing ring 14 are initially positioned such that their shaft openings 36-39 will come into alignment with the bushings 18 and 21 when the seating ring and backing ring are slid axially into the bore 12. The valve disc 15 may then be held in the seating ring 13 such that the shaft 16 may be inserted through the bushings 18 and 21 and openings 36-39 and secured in place by the fastening means 17.

To remove the valve seat and its retaining means from the bore 12 of the valve body 11, it is first necessary to remove the valve disc 15 and operating shaft 16 from the valve 10. This is accomplished by first loosening the fastening means 17 and then withdrawing the shaft 16 from the valve disc 15 and the bushings 18 and 21. The valve disc 15 may then be axially removed from within the resilient seating ring 13. The resilient seating ring 13, the backing ring 14 and the retaining means 42 and 43 are then ready for removal from the bore 12 of the valve body 11.

As shown in FIGS. 4, 8 and 9, the shallower grooved portions 41 in the illustrated embodiment are formed with ramp-shaped ends 50 inclined outwardly toward the deeper grooved portions 40. Likewise, the annular key sectors 42 are formed with beveled ends 51 which cooperatively engage the ramps 50 when the resilient seat 13 and backing ring 14 are rotated in the bore 12. The initial rotation of the resilient seat 13 and backing ring 14 within the bore 12, cause one end of each of the annular key sectors 42 to engage a portion of one of the shaft bushings 18 and 21 extending into the deeper grooved portion 40 (see FIG. 8). Further rotation then causes the beveled ends 51 at the opposite ends of the key sectors 42 to be engaged and depressed by the ramp portions 50 of the grooves 41. Continued rotation of the resilient seat 13 and backing ring 14 in the bore 12 forces the annular key sectors 42 and their associated spring elements 43 substantially wholly into the deeper grooved portions 40 (see FIG. 9). By applying an axial force to the resilient seat 13 and backing ring 14 the grooved portions 40 and 41 may now be shifted out of registry with one another and the resilient seat and backing ring may be slid axially out of the bore 12.

From the foregoing description it will be appreciated by those skilled in the art that the present invention provides a simple yet effective valve seat retaining means and method of installation and removal. With the retaining means of the present invention a lugged-type valve body as disclosed herein may be fastened to a single pipe flange and the discharge side of the valve left open to atmosphere without danger of the valve seat shifting axially in the valve body even when substantial pressure conditions are encountered. It will also be appreciated that the instant retaining means does not require the use of any seat retaining screws or bolts and the attendant necessity of tapping the valve body or the backing ring of the valve seat to receive such bolts or screws. Moreover, since the retaining means of the present invention is located between the backing ring 14 and the bore 12 of the valve body, it is effectively sealed and isolated from process fluids by the overlying resilient seating ring 13.

While the present invention has been described and illustrated in connection with certain preferred embodiments and procedures, it should be understood that it is not intended to limit the invention to those specific configurations and procedures. Rather it is intended to cover such alternative and equivalent embodiments and procedures as may fall within the spirit and scope of the invention as defined by the appended claims. Thus, while the invention has been specifically described and illustrated in connection with a disc or butterfly type valve, it should be understood that it may also be advantageously employed in other types of valves such as full or semi-ball type valves if desired.

I claim as my invention:

1. In a valve having a body defining an axial bore and a removable annular valve seat located in said bore, the improvement comprising, a pair of circumferentially extending grooves of substantially equal width, one located in the inner periphery of said bore and one located in the outer periphery of said seat, one of said grooves being deeper than the other and both grooves adapted to face one another when said seat is installed in said bore, and spring biased retaining means in the form of at least one annular sector dimensioned to fit wholly within the deeper one of said grooves during installation and removal of said seat in said bore and dimensioned to snap into the shallower one of said grooves while remaining partially in the deeper one of said grooves when said grooves are positioned to face one another.

2. An improved valve as defined in claim 1 wherein each of said grooves formed in the inner periphery of said bore and the outer periphery of said seat includes two substantially semi-circumferentially extending portions and said retaining means includes a pair of substantially semi-annular sectors each dimensioned to fit within one facing pair of said grooved portions.

3. An improved valve as defined in claim 2 wherein at least one end of each of said shallower grooved portions is formed with a ramp extending toward one of said deeper grooved portions for biasing said retaining means into said deeper grooved portions upon rotation of said seat within said bore.

4. An improved valve as defined in claim 3 wherein both ends of each of said shallower grooved portions are formed with said ramps.

5. An improved valve as defined in claim 3 wherein at least one end of each of said retaining means sectors is beveled to cooperatively engage said ramp as said seat is rotated within said bore.

6. An improved valve as defined in claim 5 wherein both ends of each of said shallower grooved portions are formed with said ramps and both ends of each of said retaining means sectors are beveled to cooperatively engage said ramps.

7. An improved valve as defined in claim 1 wherein said retaining means includes a key portion having a thickness substantially equal to two times the depth of the shallower one of said grooves and a spring element interposed between said key portion and the base of the deeper one of said grooves.

8. An improved valve as defined in claim 2 wherein said deeper grooved portions are located in the inner periphery of said bore, said shallower grooved portions are provided with ramp shaped ends extending toward said deeper grooved portions and said retaining means sectors are beveled to cooperatively engage said ramps for biasing said retaining means into said deeper grooved portions upon rotation of said seat within said bore.

9. An improved valve as defined in claim 8 wherein said body includes means for restraining rotation of said retaining means sectors within said deeper grooved portions as said seat is rotated within said bore.

10. An improved valve as defined in claim 1 wherein said valve seat includes a rigid reinforcing ring member externally dimensioned for axial insertion into said bore in close-fitting relationship, and an annular resilient seating element overlying and enclosing the inner surface and end portions of said ring member, and one of said grooves is formed in the outer periphery of said ring member.

11. The method of installing an annular valve seat means within the bore of a valve body and restraining said seat means against axial movement in said bore, said bore and said seat means each having a circumferentially extending grooved portion, one deeper than the other, adapted to face one another and receive therein at least one spring biased retaining means in the form of an annular sector, comprising the steps of:
biasing said retaining means wholly within the deeper one of said grooved portions and holding said retaining means in said position while axially sliding said valve seat means into said bore,
and axially aligning said grooved portions to permit said spring biased retaining means to snap into the shallower one of said grooved portions while still remaining partially in the deeper one of said grooved portions.

12. The method of claim 11 wherein the deeper one of said grooves is located in said bore and said biasing step includes the insertion of a tapered mandrel axially into said bore to bias said retaining means wholly into said deeper groove.

13. The method of removing an annular valve seat means which is restrained from axial movement within the bore of a valve body by a spring biased retaining means in the form of an annular sector located in a pair of facing circumferentially extending grooved portions, one deeper than the other, formed in said bore and seat means, at least one end of the shallower one of said grooves having an outwardly inclined end portion comprising the steps of:
rotating said seat means relative to said body to engage said inclined end portion with one end of said spring biased retaining means and force said spring biased retaining means into the deeper one of said grooved portions, and applying an axial force to said seat means to shift said grooved portions out of registry with one another and slide said seat means axially out of said bore.

14. The method of claim 13 wherein the deeper one of said grooves is located in said bore and said retaining means is restrained against rotation within said deeper groove as said is rotated relative to said body.

15. The method of claim 14 wherein said retaining means has a beveled end portion to cooperatively engage said inclined end portion of said shallower groove as said seat is rotated relative to said body.

* * * * *